Oct. 2, 1956

V. J. CALDECOURT ET AL
APPARATUS FOR USE IN ALIGNING EXIT
SLITS OF A SPECTROGRAPH 2,764,909

Filed June 2, 1955

INVENTORS
Victor J. Caldecourt
John C. Wahr
BY
Griswold & Burdick
ATTORNEYS

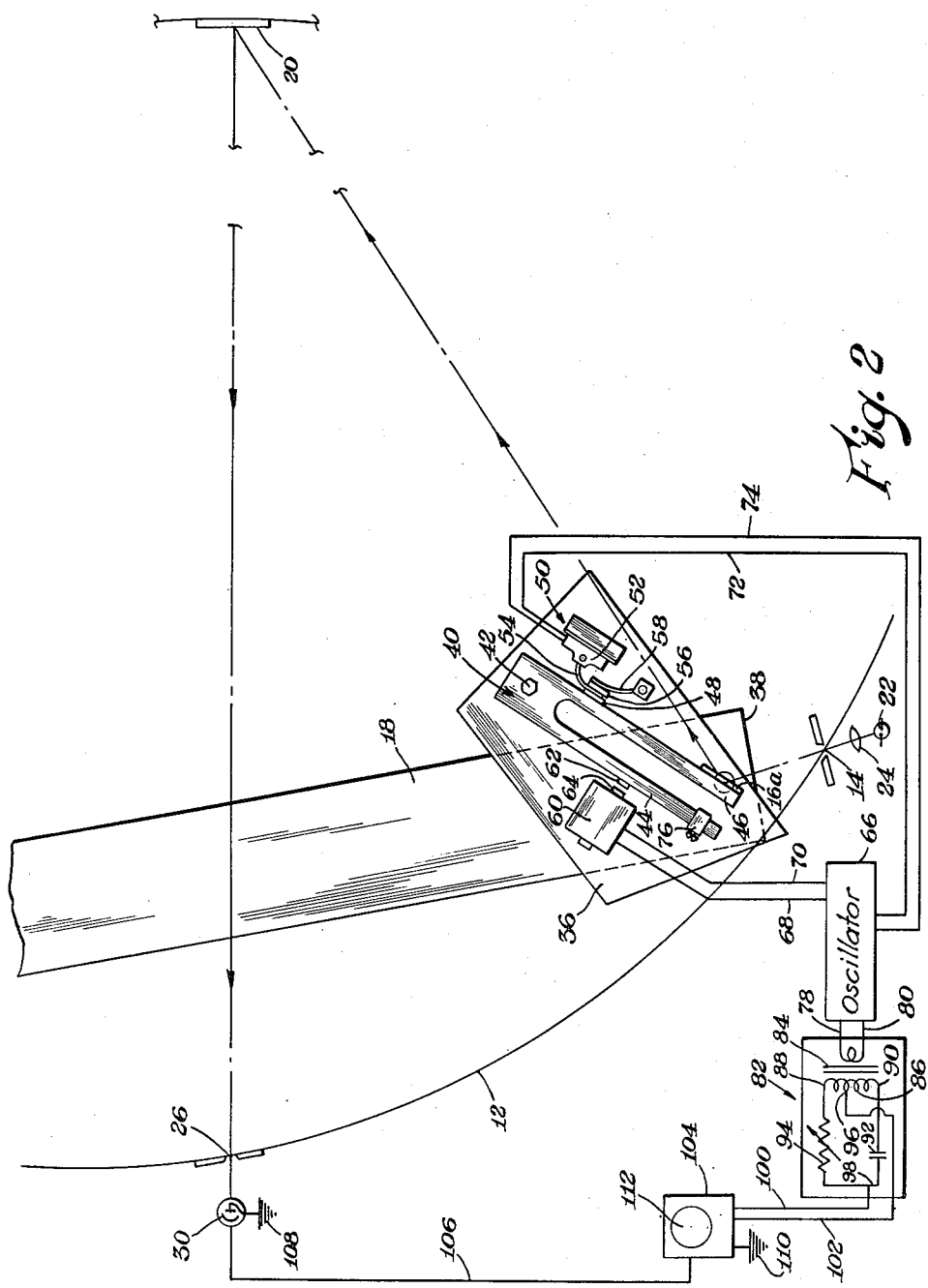

United States Patent Office 2,764,909
Patented Oct. 2, 1956

2,764,909

APPARATUS FOR USE IN ALIGNING EXIT SLITS OF A SPECTROGRAPH

Victor J. Caldecourt and John C. Wahr, Midland, Mich., assignors to The Dow Chemical Company, Midland, Mich., a corporation of Delaware Application June 2, 1955, Serial No. 512,706

11 Claims. (Cl. 88—14)

This invention relates to apparatus for indicating the relative position of a spectral line with respect to an exit slit of a spectrograph.

In a spectrograph, light from a sample to be analyzed passes through an entrance slit in the instrument and is then reflected onto a grating or other light dispersing member which breaks up the light into its spectral lines which are reflected towards an exit slit or slits in the spectrograph. The entrance slit and the exit slit or slits are mounted on the spectrograph frame in such a manner that light passing through the entrance slit is brought to a focus at the exit slit or slits. The position of the exit slit must be capable of adjustment in order that a particular spectral line will pass through the slit and its quantitative light values may be recorded.

When wide exit slits are used in which the width of the spectral line is a small fraction of the width of the slit, alignment of the slit with the line is uncomplicated although the alignment must be carefully done. The use of wide exit slits, however, results in analytical error because light from the spectral continuum and from other lines which are closely adjacent to the desired spectral line (which is centered in the slit) also passes through the exit slit and is recorded. The use of exit slits which are only slightly wider than the desired spectral line whose light value is to be recorded is an obvious answer to the problem of eliminating unwanted light impingement on the recording medium. However, when narrow exit slits are used, the alignment of each exit slit with a desired line has in the past often required that a skilled technician spend over an hour in carefully adjusting the position of the slit.

It can be appreciated that, when spectrographic analysis of random samples is done on a production basis, the time required to align exit slits often limits the adaptability and output rate of the spectrograph.

Accordingly, a principal object of this invention is to provide improved apparatus for use in determining the alignment of exit slits in a spectrograph with respect to spectral lines.

A further object of this invention is to provide improved apparatus which is adapted to provide a continuous visual indication of the relative position of a spectral line with respect to an exit slit of a spectrograph.

In accordance with this invention the light beam from a desired spectral line is synchronously swept or scanned across the exit slit of a spectrograph at periodic intervals and impinges on a light sensitive electrical device whose output is coupled to deflection plates of an oscilloscope to cause a pip along the sweep trace of the oscilloscope, the sweep circuit of the oscilloscope being synchronized with the scanning of the light beam. The position of the pip along the sweep trace indicates the relative position of the exit slit with respect to the position of the desired spectral line.

The invention, as well as additional objects and advantages thereof, will best be understood when the following detailed description is read in connection with the accompanying drawings, in which:

Fig. 2 is a fragmentary diagrammatic view, on an enlarged scale, of a spectrograph showing a modified fore mirror mounting and associated apparatus plus a fore mirror scanning oscillator and an oscilloscopic indicator in accordance with this invention;

Figure 1:
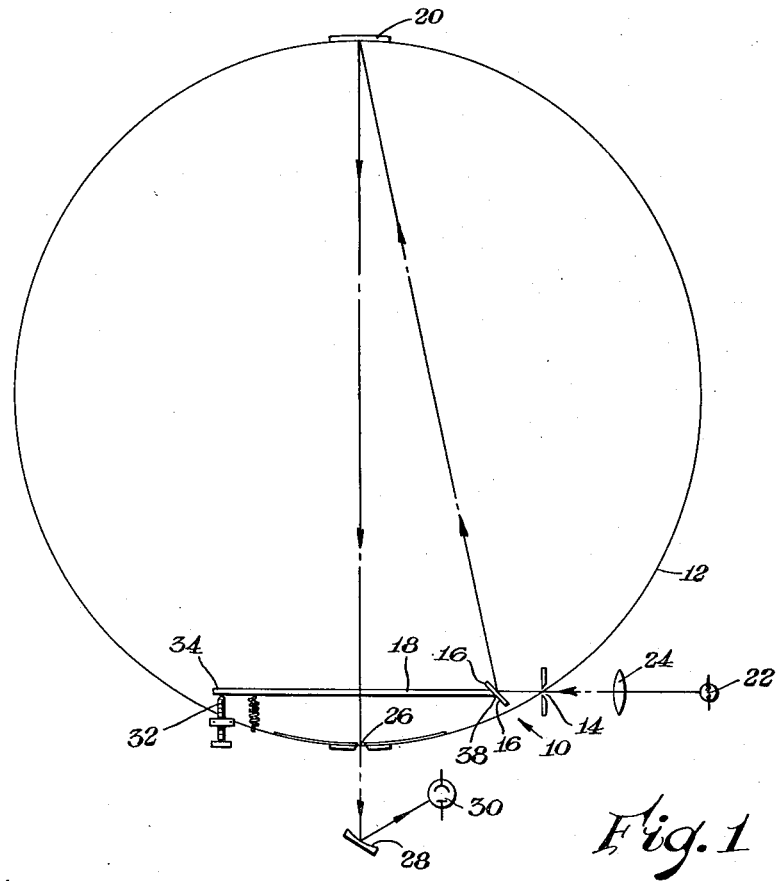
Fig. 1 is a diagrammatic view of a typical concave grating spectrograph as equipped for normal operation.

Referring to Fig. 1 there is shown a spectrograph indicated generally by the numeral 10 including a Rowland circle 12, a light entrance slit 14, and a fore mirror 16, affixed to an adjustably mounted monitor bar 18 located within the Rowland circle 12. A diffraction grating 20 is disposed across the circle 12 from the entrance slit 14 and is so positioned that light from a source 22 which is directed upon the entry slit 14 by a lens 24 impinges on the fore mirror 16 and is reflected onto the diffraction grating 20 (or other form of light dispersing device such as a prism). Light impinging on the grating 20 is dispersed into its spectral line components which are reflected from the grating surface. A selected spectral line passes through an exit slit 26 which is usually parallel to (that is, perpendicular to a common horizontal plane) the entrance slit 14 of the spectrograph and is reflected from a focusing mirror 28 onto a photocell tube 30 whose output signal, a function of the light value impinging thereon, may be observed or recorded in any suitable manner. The angle made by the fore mirror 16 with respect to the entry slit 14 and grating 20 may be adjusted by means of the vernier screw 32 at the end 34 of the monitor bar 18 which is remote from the fore mirror 16. The vernier screw 32 is used in displacing by a uniform amount all spectral lines in order to correct for a misalignment of lines with exit slits due to distortion of the spectrograph frame (including the Rowland circle 12).

Thus, moving the monitor bar 18 will permit an "across the board" correction of spectral line displacement to realign the spectral light beams or lines with their respective exit slits. However, the monitor bar 18 is of little help in initially aligning the exit slits 26 (more than one exit slit is commonly used) with specific lines in the spectra.

Because the amount of an element present in a sample to be analyzed in a spectrograph is indicated by the strength or light value of its spectral line or lines, it is necessary if an accurate spectrographic analysis of the sample is to be made that a spectral line be well aligned with its exit slit. It is also desirable, in order to reduce or eliminate light from spectral continuum and adjacent spectral lines passing through the slit and impinging on the photocell, that the exit slit be no larger than necessary to assure passage therethrough of light from only one spectral line. Such an ideal slit width is seldom practical to obtain, and a slit allowing a border of, say, 10 microns on each side of the spectral line passing through it, represents a good practical limit of slit width.

In addition to the advisability of employing slits of minimum width, these slits must also be brought accurately parallel to the spectral line which is to pass through each slit. The exit slits 26 are capable of angular displacement to some extent to permit them to be adjusted to lie accurately along the spectral line. However, the border area between the spectral line and slit jaws is often relied upon to permit all the light from a line to pass through the slit 26 even though the spectral line is slightly curved.

Considering that exit slit widths of 50 microns (approximately .002 inch) are often used, it can be appreciated that the centering of a specified spectral line in such a slit requires careful and painstaking adjustment on the part of the technician doing the work.

Referring now to Fig. 2, there is shown a Rowland circle 12, monitor bar 18, entrance slit 14, exit slit 26, and grating 20 as in Fig. 1. The mounting of the fore mirror, however, is changed. A flat metal mounting plate 36 is secured to the fore mirror end part 38 of the monitor bar 18. A tuning fork, indicated generally by the numeral 40, or other suitable means which can be vibrated synchronously at varying amplitudes is clamped, as by the bolt 42, to the mounting plate 36. The tines 44, 46 of the tuning fork 40 extend transversely across the monitor bar 18, making approximately the same angle with respect to the monitor bar 18 as made by the fore mirror 16 in Fig. 1. The tuning fork 40 is made of metal, such as magnesium, which may be made to resonate at the desired frequency yet be of small enough size to be conveniently mounted in the spectrograph 10.

A fore mirror 16a having a front reflective surface is cemented or otherwise secured to the outer end of the tine 46 with the reflective surface of the fore mirror 16a on the side of the tine 46 which faces the end 38 of the monitor bar 18. Near the other end of the tine 46 there is secured a rubber block 48 (which may be cemented or screwed to the tine 46). The block 48 provides a bearing surface to which an electro-mechanical transducer assembly, indicated generally by the numeral 50, is coupled. The electro-mechanical transducer assembly illustrated is a piezo-electric crystal 52 and coupled needle 54 such as is used in crystal pickup phonographs. The crystal 52 is secured to the mounting plate 36. The needle 54 is bent and lies against the rubber block 48 on the tine 46. The needle 54 is held in contact with the rubber block 48 by a second rubber block 56 and spring 58 which is secured to the mounting plate 36.

The tuning fork 40 is driven by an electromagnet 60 which is secured to the mounting plate 36 beside the tine 44 of the tuning fork 40. A small strip 62 of magnetic material, such as steel, is secured to the tine 44 about midway along the length of the tine 44. The strip 62 is aligned with and closely spaced to the end of the pole piece 64 of the electromagnet 60.

The electromagnet 60 is energized by an oscillator 66 whose output is coupled to the electromagnet through leads 68, 70. Part of the output of the electro-mechanical transducer 52, the crystal pickup, is coupled to the input of the oscillator 66 through the leads 72, 74 and provides the energy feedback coupling between the oscillator output and input circuits. The tine 44 of the tuning fork 40 has a slidable counterweight 76 whose position is adjusted to cause the tuning fork 40 to resonate at a single frequency. Such a slidable member 76 is necessary because of the additional weights secured to the tines 44, 46 which tend to change the natural resonant frequency of each tine.

A tuning fork oscillator circuit of a type suitable for use as the oscillator 66 is shown and described in the Handbook of Industrial Electronics Circuits, by John Markus and Vin Zeluff, first edition (1948), page 161 (published by McGraw-Hill Book Co.). The above oscillator was also described on page 15 of the January 1940 issue of "Electronics" magazine. However, other suitably stabilized oscillator circuits could be adapted for use in the apparatus of this invention.

The oscillator signal is also coupled through the leads 78, 80 to a phase control circuit indicated generally by the numeral 82 which includes, as shown in Fig. 2, an input transformer 84 having a tapped secondary winding 86. The outer ends 88, 90 of the secondary winding 86 are coupled together through a series connected condenser 92 and variable resistor 94. The "output" of the phase control, taken from the tap 96 and a point 98 between the condenser 92 and variable resistor 94, is coupled by means of the leads 100, 102 to the sweep circuit of an oscilloscope 104 which is one form of indicator device suitable for use with this invention. The output of the photocell 30 on which the light passing through the exit slit 26 is focused, is coupled to the vertical deflection circuit (not shown) of the oscilloscope 104 through the lead 106 and ground connections 108, 110 of the photocell 30 and oscilloscope 104, respectively.

In the operation of the apparatus of the invention, the oscillator 66 is utilized to drive the electromagnet 60 and thus cause the tines 44, 46 of the tuning fork 40 and the attached fore mirror 16a to vibrate at considerable amplitude. The oscillator 66 and tuning fork 40 (as loaded), of course, have the same resonant frequency. The vibration of the fore mirror 16a causes the light beam (or ray) entering the spectrograph 10 through the entry slit 14 to scan back and forth across the grating 20 rather than be reflected onto a single section of the grating 20 as is the case when a nonvibrating fore mirror 16 is used.

The scanning of the light beam or ray across the grating 20 is accompanied by a similar scanning of the reflected spectral lines which are reflected from the grating 20 towards the exit slit 26. The result is that the desired spectral region, composed of one or several spectral lines, passes through the exit slit 26 and impinges upon the photocell 30 in a periodically recurring manner and in synchronism with the vibration of the fore mirror 16a.

Because the sweep circuit of the oscilloscope 104 is synchronized with the motion of the vibrating fore mirror 16a through the crystal pickup 52 and the oscillator 66, the horizontal deflection of the trace on the oscilloscope 104 represents the distance through which the light beam or ray is caused to be scanned by the fore mirror 16a. The sweep potential is sinusoidal, as is the motion of the vibrating tuning fork 40.

The output of the photocell 30, when applied to the vertical input of the oscilloscope 104, shows the amplitude or intensity (as the vertical deflection component of the trace) of the spectral lines passing through the exit slit 26. The position of the spectral lines measured along the time base (sweep trace with no vertical deflection signal is the "time base") indicates their relative position with respect to the exit slit 26 when the fore mirror 16a is not vibrating. That is, the spectral line whose amplitude peak occurs at the center of the time base of the oscilloscope (with oscilloscope sweep synchronized with vibration frequency of fore mirror) would appear through the exit slit when the fore mirror is not vibrating. The above statement is true only when the fore mirror vibrates to the same amplitude on each side of its neutral position. Such vibration does occur. Conversely, spectral lines appearing on one side or another of the center of the oscilloscope horizontal deflection displacement sweep line would be similarly disposed with respect to the exit slit 26. Thus, to center the exit slit 26 on a particular line whose amplitude is shown on the oscilloscope screen, the exit slit is manually moved along the Rowland circle in any desired manner until the desired spectral line appears at the center of the horizontal deflection displacement (sweep) line on the oscilloscope screen 112.

Figure 3:
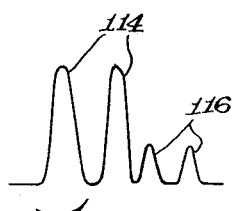
Fig. 3 is a typical indicator trace showing the position of two spectral lines each of which is misaligned with the exit slit of the spectrograph and with the oscilloscope sweep voltage out of phase with the scanning of the light beam.

Oscilloscope traces showing the position of spectral lines with respect to the exit slit are shown in Figs. 3–7. A direct current spark is used as the illuminating source. When alternating current sparking is used, the wave shapes may vary, but may be used with the apparatus of this invention in the same general manner as described below. The oscilloscope trace shown in Fig. 3 represents two spectral lines 114, 116, one of higher intensity than the other and each occurring twice in the trace, as shown when the sweep frequency of the oscilloscope 104 is the same as the frequency of vibration of the fore mirror 16a but is not in phase with the vibration of the fore mirror 16a. Although the horizontal deflection signal applied to the oscilloscope 104 is taken from the oscillator input circuit (of oscillator 66), parameters in the oscilloscope 104, the oscillator unit 66, the crystal pickup 52, or in the coupling between the oscilloscope 104, oscillator 66 or crystal pickup 52 may result in a phase shift. For this reason the phase control unit 82 is provided where by adjusting the resistor 94 in the phase control unit 82 the sweep of the oscilloscope trace may be made to be in phase with the vibrating fore mirror 16a.

Figure 4:
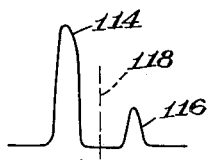
Fig. 4 shows the position of two spectral lines when the light beam scanning and oscilloscope sweep are in phase but neither of the lines is in alignment with the exit slit.

Fig. 4 shows the trace of the spectral lines in Fig. 3 as they appear when the oscilloscope sweep and the vibrating fore mirror 16a are synchronized (in phase) but neither line is centered on the exit slit. The dotted line 118 in Figs. 4–7 has been added to show the center of the sweep line.

Figure 5:
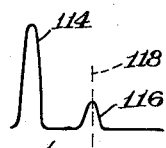
Fig. 5 shows the two lines of Fig. 4 with the line of lesser amplitude aligned with the exit slit.

Fig. 5 shows the small, more faint line 116 in alignment with the exit slit since it appears at the center of the horizontal deflection displacement (sweep trace).

Figure 6:
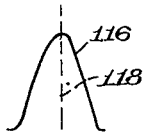
Fig. 6 shows the appearance of the aligned spectral line when the scanning amplitude of the light ray is decreased.

Fig. 6 shows the faint line 116 as it appears when the amplitude of vibration of the fore mirror 16a is decreased and the vertical and horizontal gain of the oscilloscope 104 is increased. The line 116 appears across almost the entire (sweep line trace) and is apparently well centered with respect to the exit slit 26.

Figure 7:
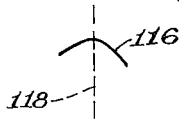
Fig. 7 shows that, with a still further reduction in amplitude of the light ray scanning, the spectral line in Fig. 6 is slightly misaligned with respect to the exit slit.

Fig. 7, however, shows the trace of the peak of the faint line 116 when the amplitude of the fore mirror 16a is further decreased. It is readily noticed in this figure that the faint line 116 is not precisely centered and the exit slit should be moved slightly in order that the trace of the peak be symmetrical on each side of the center of the sweep line trace.

In connection with the operation of the apparatus of the invention, it should be remembered that the exit slit 26 must initially be located along the part of the Rowland circle 12 which is within the pattern of scanning produced by the vibration of the fore mirror 16a. Also while the fore mirror 16a is the optical element which is most convenient to vibrate, other elements may be vibrated or rotated to cause the scanning of the light beam or spectrum. Other elements which could be vibrated, for example, are the grating 20 or a prism if used as a substitute for the grating, the entrance slit 14 or the exit slit 26, or a parallel surfaced quartz plate (not shown) disposed between the entrance slit 14 and the fore mirror 16a or between the grating 20 and exit slit 26, or between the entrance slit 14 and the grating 20 if a spectrograph not employing a fore mirror is used.

The apparatus may also be used to advantage in determining if the exit slit 26 is parallel with the spectral line. After the previously described manner of slit alignment has been completed, either the top or bottom half of the exit slit 26 is blocked off and the exit slit 26 adjusted for maximum centering with respect to the spectral line. The other half of the exit slit 26 is then blocked off and the exit slit 26 is again adjusted for maximum centering with the spectral line beam as indicated on the oscilloscope 104. When light passing through both the upper and lower half of the exit slit 26 results in symmetrical traces as described above for the entire slit, the slit is at its best aligned position with respect to the spectral line.

It can readily be appreciated that once the exit slit 26 is set within the scanning pattern of the spectral lines (and this may easily be done by setting the exit slits in accordance with charts showing the approximate position of lines along the Rowland circle), the centering of a line with respect to the exit slit 26 may be rapidly and accurately accomplished even by semi-skilled personnel.

In a vibrating fore mirror arrangement which has been successfully used the tuning fork was machined from a block of magnesium. Each tine of the fork is 2½ inches in length and ⅛ inch by ⅜ inch in cross section. The resonant frequency of the tuning fork, with fore mirror and other attachments in place, is 500 cycles per second.

The amplitude of vibration of the tines may be controlled from a few microns to approximately a centimeter.

It is of prime importance that, whatever element in the system is vibrated to provide a scanning pattern of the spectral lines, the vibration be as nearly symmetrical as possible with respect to the rest position of the element being vibrated. Although a tuning fork has been described as the vibratable driving element, other driving elements such as voice coils of radio speakers, piezo electric crystals, magnetic recording heads, etc. were tried and used with some degree of success. Each of the driving elements except the tuning fork had some damping device associated with it which apparently affected its symmetry of vibration with respect to a non-vibrating rest position. Many of the driving elements tried did not return to the same rest position each time the vibration of the element was discontinued. The tuning fork, with its highly resonant characteristics, provided the most symmetrical vibrations around its rest position and was the best of the elements tested with respect to returning always to the same rest position.

As a check to make certain the fore mirror has returned to its true zero deflection position, the output of the photocell may be observed on the oscilloscope with the normal sweep circuit in operation and with the oscillator de-energized. Under these conditions the fore mirror will be in its normal operating position, and if the exit slit is properly centered the amplitude of the trace on the oscilloscope should be approximately the same as when the fore mirror is vibrating.

We claim:

1. Apparatus for indicating the position of an exit slit of a spectrograph with respect to a spectral line, comprising mechanically vibratable means for causing at least an apparent scanning of said spectral line across said exit slit in a periodically recurring manner, electro-mechanical transducer means for generating an electrical output signal whose frequency varies in accordance with the rate of vibration of said mechanically vibratable means, light responsive means for generating an electrical output signal in response to light from spectral lines which scan across said exit slit and impinge on said light responsive means, and a cathode ray indicator, said indicator having vertical and horizontal deflection means coupled thereto, means coupling the electrical output signal of said light responsive means to one of said deflection means and means coupling the output of said electro-mechanical transducer means to another of said deflection means whereby the position along the trace on said cathode ray indicator of a pulse appearing as a result of spectral line light impingement on said light responsive means is an indication of the relative position of the spectral line with respect to the exit slit in the absence of vibration of said vibratable means.

2. Apparatus for indicating the position of an exit slit of a spectrograph with respect to a spectral line, comprising mechanically vibratable means for causing at least an apparent scanning of said spectral line across said exit slit in a periodically recurring manner, electromagnetic driving means coupled to said vibratable means, electro-mechanical transducer means for generating an electrical output signal whose frequency varies in accordance with the rate of vibration of said mechanically vibratable means, said transducer means being coupled to said vibratable means, light responsive means for generating an electrical output signal in response to light from spectral lines which scan across said exit slit and impinge on said light responsive means, and a cathode ray oscilloscope, said oscilloscope having vertical and horizontal deflection means coupled thereto, means including an electronic amplifier for coupling the electrical output signal of said light responsive means to one of said deflection means and means including an electronic amplifier for coupling the output of said electro-mechanical transducer means to another of said deflection means whereby the position along the trace on said cathode ray oscilloscope of a pulse appearing as a result of spectral line light impingement on said light responsive means is an indication of the relative position of the spectral line with respect to the exit slit in the absence of vibration of said vibratable means.

3. Apparatus for indicating the position of an exit slit of a spectrograph with respect to a spectral line, comprising mechanically vibratable means for causing at least an apparent scanning of said spectral line across said exit slit in a periodically recurring manner, said vibratable means being disposed in the path of the light ray within the spectrograph, piezo-electric transducer means for generating an electrical output signal whose frequency varies in accordance with the rate of vibration of said mechanically vibratable means, said transducer being mechanically coupled to said vibratable means, photoelectric light responsive means for generating an electrical output signal in response to light from spectral lines which scan across said eixt slit and impinge on said light responsive means, and an oscilloscope having a cathode raye tube indicator, said indicator having vertical and horizontal deflection means coupled thereto, means including electrical leads for coupling the electrical output signal of said light responsive means to one of said deflection means and means including electrical leads for coupling the output of said piezo electric transducer means to another of said deflection means whereby the position along the trace on said cathode ray indicator of a pulse appearing as a result of spectral line light impingement on said light responsive means is an indication of the relative position of the spectral line with respect to the exit slit in the absence of vibration of said vibratable means.

4. Apparatus in accordance with claim 3, wherein said vibratable means comprises a fore mirror which is secured to a tine of a tuning fork.

5. Apparatus for indicating the position of an exit slit of a spectrograph with respect to a spectral line, comprising an electromagnetically driven mechanically vibratable means including a tuning fork having a mirror attached to a tine thereof for causing scanning of said spectral line across said exit slit in a periodically recurring manner, piezoelectric transducer means for generating an electrical output signal whose frequency varies in accordance with the rate of vibration of said tuning fork, photocell means for deriving an electrical output signal in response to light from spectral lines which scan across said exit slit and impinge on said photocell, and a cathode ray oscilloscope having a cathode ray indicator, said indicator having vertical and horizontal deflection circuits coupled thereto, the electrical output signal of said photocell being coupled to vertical deflection circuit, and the electrical output of said piezo-electric transducer being coupled to said horizontal deflection circuit whereby the position along the trace of the cathode ray beam on said cathode ray indicator of a pulse appearing as a result of spectral line light impingement on said photocell is an indication of the relative position of the spectral line with respect to the exit slit in the absence of vibration of said vibratable means.

6. Apparatus in accordance with claim 5, wherein phase control means is provided in the coupling of said piezoelectric transducer signal to the horizontal deflection circuit of said oscilloscope.

7. Apparatus in accordance with claim 5, wherein an oscillator having an input and output circuit is provided for energizing said electromagnetically driven vibratable means, and lead means for coupling at least a part of said output signal of said piezo-electric transducer to the input circuit of said oscillator.

8. Apparatus in accordance with claim 7, wherein the operating frequency of said oscillator exceeds 50 cycles per second.

9. Apparatus in accordance with claim 7, wherein the operating frequency of said oscillator is of the order of 500 cycles per second.

10. Apparatus in accordance with claim 7, wherein means are provided for controlling the energy level applied to said electromagnetically driven vibratable means from said oscillator.

11. Apparatus in accordance with claim 3, wherein said mechanically vibratable means vibrates substantially the same amount on each side of a stable rest position.

No references cited.